United States Patent
Lin et al.

(10) Patent No.: US 6,888,400 B2
(45) Date of Patent: May 3, 2005

(54) CHARGE PUMP CIRCUIT WITHOUT BODY EFFECTS

(75) Inventors: Hong-chin Lin, Taipei (TW);
Nai-Hsien Chen, Tai-Chung (TW);
Jain-Hao Lu, Taipei (TW);
Chien-Hung Ho, Hsin-Chu (TW)

(73) Assignee: eMemory Technology Inc., Hsin-Chu (TW)

( * ) Notice: Subject to any disclaimer, the term of this patent is extended or adjusted under 35 U.S.C. 154(b) by 110 days.

(21) Appl. No.: 10/604,405

(22) Filed: Jul. 17, 2003

(65) Prior Publication Data

US 2004/0222841 A1 Nov. 11, 2004

Related U.S. Application Data

(62) Division of application No. 10/064,714, filed on Aug. 9, 2002, now Pat. No. 6,642,773.

(51) Int. Cl.[7] .............................................. G05F 1/10
(52) U.S. Cl. ..................... 327/536; 327/537; 363/59; 363/60
(58) Field of Search .................. 327/390, 589, 327/534–537; 307/110; 363/59, 60

(56) References Cited

U.S. PATENT DOCUMENTS

| | | | | |
|---|---|---|---|---|
| 5,982,223 A | * | 11/1999 | Park et al. | 327/536 |
| 6,130,574 A | * | 10/2000 | Bloch et al. | 327/536 |
| 6,175,264 B1 | * | 1/2001 | Jinbo | 327/536 |
| 6,452,438 B1 | * | 9/2002 | Li | 327/536 |
| 6,677,806 B2 | * | 1/2004 | Bloch | 327/536 |

* cited by examiner

Primary Examiner—Timothy P. Callahan
Assistant Examiner—An T. Luu
(74) Attorney, Agent, or Firm—Winston Hsu

(57) ABSTRACT

A charge pump circuit has input and output nodes, a first transistor, a second transistor, a third transistor, a first capacitor, and a second capacitor. A drain of the first transistor and a drain of the second transistor are connected to the input node. A source of the second transistor and a drain of the third transistor are connected to the output node. The first capacitor is connected to a gate of the second transistor. The third transistor is connected to a substrate and a source of the second transistor. When the first transistor is turned on, a voltage at the input node will charge the first capacitor. When the second transistor is turned on, the third transistor is turned on simultaneously so that the substrate and the source of the second transistor will reach the same voltage level. Then, voltage at the input node will charge the second capacitor.

6 Claims, 14 Drawing Sheets

CHARGE PUMP CIRCUIT WITHOUT BODY EFFECTS

CROSS REFERENCE TO RELATED APPLICATIONS

In this divisional application, the specification and drawings are carried forward from the application Ser. No. 10/064,714, filed Aug. 9, 2002 now U.S. Pat. No. 6,642,773 without any amendment.

BACKGROUND OF INVENTION

1. Field of the Invention

The present invention relates to a charge pump circuit, and more particularly, to a charge pump circuit without body effects.

2. Description of the Prior Art

Please refer to FIG. 1, which is a diagram of an electrical erasable and programmable read only memory (EEPROM) 10. The EEPROM 10 has a substrate 12, a source 14, a drain 16, a floating gate 18, and a control gate 20. There is an oxide layer 24 positioned between the floating gate 18 and a channel 22 within the substrate 12, and the substrate 12 is electrically connected to a reference voltage Vbb. Generally speaking, the reference voltage Vbb is provided by a ground voltage (0 volts). If the EEPROM 10 is an n-channel metal-oxide semiconductor (NMOS) structure, the substrate is a p-doped region, and the source 14 and the drain 16 are both n-doped regions. On the contrary, if the EEPROM 10 is a p-channel metal-oxide semiconductor (PMOS) structure, the substrate is an n-doped region, and the source 14 and the drain 16 are both p-doped regions.

The principle of the EEPROM 10 is described as follows. A control voltage Vcg inputted to the control gate 20 will alter the number of electrons stored on the floating gate 18. The electrons stored on the floating gate 18 further affect the threshold voltage associated with the channel 22. Therefore, the EEPROM 10 can store two binary values according to the electrons stored on the floating gate 18. The electrons positioned within the channels are expelled to the floating gate 18 for changing the corresponding number of electrons stored on the floating gate 18. In order to make the drain 16 and the source 14 be electrically connected, the control voltage Vcg is applied to the control gate 20 for overwhelming the threshold voltage affected by the floating gate 18. If the channel 22 is established successfully, a corresponding current will flow out of the drain 16 via the channel 22. On the contrary, if the channel 22 is not established successfully, no current will exist. Therefore, the EEPROM 10 can check the establishment of the channels, that is, detect the current flowing through the source 14 and the drain 16 to determine whether a binary value "1" or an another binary value "0" is stored.

The binary value "1" or "0" is written into the EEPROM 10 through a programming process and an erasing process. For example, in order to program the EEPROM 10, the control voltage Vcg having 10 volts is applied to the control gate 20, a voltage Vd having 5 volts is applied to the drain 16, and a voltage Vs having 0 volts is applied to the source 14. When electrons move from the source 14 toward the drain 16, an electric field formed between the control gate 20 and the source 14 and an electric field formed between the source 14 and the drain 16 will pull electrons from the channel 22 to the floating gate 18. In order to erase the EEPROM 10, the control voltage Vcg having −10 volts is applied to the control gate 20, a voltage Vs having 5 volts is applied to the source 14, and the drain 16 is floating. Because the control gate 20 has a negative voltage and the source 14 has a positive voltage, the electric field formed between the control gate 20 and the source 14 will expel electrons from the floating gate 18 to the source 14. Therefore, the EEPROM 10 is erased with few electrons left on the floating gate 18.

Recently, a demand for portable electric appliances has increased. Technology related to the EEPROM 10, such as a flash memory, has been greatly researched to meet many requirements of the portable electric appliances. In order to increase the duration of using a portable electric appliance with a limited power capacity, the portable electric appliance, generally speaking, is operated under an environment providing a low operating voltage such 3.3 volts or below. As mentioned above, the programming process and erasing process individually require the control voltage Vcg with 10 volts or 10 volts inputted into the control gate 20. Therefore, the EEPROM 10 must adopt a charge pump circuit to generate the required high voltages from the low operating voltage for executing the programming process and the erasing process.

Please refer to FIG. 2, which is a diagram of a driving circuit 30 of the EEPROM 10 shown in FIG. 1. The driving circuit 30 has a memory array 32, a clock generator 34, a first charge pump circuit 36 for generating positive voltages, a second charge pump circuit 38 for generating negative voltages, and an address decoder 40. The memory array 32 has a plurality of memory cells 42 arranged in a matrix format. The address decoder 40 can select one memory cell out of the memory array 32 to be further processed. The driving circuit 30 uses the operating voltage Vdd provided by a power supply 43 to work properly. If the operating voltage has a low voltage level such as 1.8 volts, the operating voltage Vdd cannot be used for programming or erasing the memory cell 42 successfully. Therefore, the first charge pump circuit 36 is designed for generating a positive voltage (10 volts) required for programming the memory cell 42, and the second charge pump 38 is designed for generating a negative voltage (−10 volts) required for erasing the memory cell 42. In addition, in order to control operations of the first and second charge pump circuits 36, 38, the driving circuit 30 uses the clock generator 34 to generating a plurality of non-overlapping clock signals for driving the first and second charge pump circuits 36 correctly. The related operation is described as follows.

Please refer to FIG. 2, FIG. 3, and FIG. 4. FIG. 3 is a diagram of the first charge pump circuit 36 shown in FIG. 2, and FIG. 4 is a timing diagram of the clock signals generated by the clock generator 34 shown in FIG. 2. The first charge pump 36 has a plurality of transistors 44, 46, 48, 50, 52 and a plurality of capacitors 54, 56, 58, 60, 62. The transistors 44, 46, 48, 50, 52 are all metal-oxide semiconductor (MOS) transistors. The clock generator 34 is used for generating a first clock signal 64 to the capacitors 54, 58 and a second clock signal 66 to the capacitors 56, 60. Furthermore, a difference between a high voltage level and a corresponding low voltage level of the first and second clock signals 64, 66 is equal to the operating voltage Vdd of the first charge pump circuit 36. As shown in FIG. 4, the transistor 44 is turned on so that the operating voltage Vdd charges the capacitor 54 at time t0. Because the transistor 44 shifts the voltage transmitted through the transistor 44 by a threshold voltage Vt, the voltage of node A is Vdd−Vt. At time t1, the first clock signal 64 has a pulse with corresponding amplitude Vdd, and the second clock signal 66 remains at a low voltage level. Therefore, the voltage of node A becomes 2Vdd−Vt so that the transistor 46 is turned on. The voltage of node A (2Vdd−Vt) starts charging the capacitor 56, and the voltage of node B will approach 2Vdd−2Vt. Similarly, the voltage of node C finally will approach 5Vdd−5Vt, which is greater than the operating voltage Vdd. However, substrates of the transistors 44, 46, 48, 50, 52 are commonly connected to a ground voltage (0 volts), and a voltage difference between the substrate and the source will induce a corresponding body effect. Therefore, each of the transistors 44, 46, 48, 50, 52 shift the voltage transmitted through the corresponding transistors 44, 46, 48, 50, 52 by a greater voltage difference Vt+dV. The increment dV is generated by the body effect. When the voltage levels stored by the capacitors 54, 56, 58, 60, 62 increase, the voltage difference between the substrate and the source increases. Therefore, the body effect is serious enough to greatly reduce the output voltage when the transistors 44, 46, 48, 50, 52 are turned on sequentially. To sum up, the actual output voltage of the prior art charge pump circuit is lower than the ideal value because of the induced body effects.

SUMMARY OF INVENTION

It is therefore a primary objective of the claimed invention to provide a charge pump circuit without body effects to solve the above mentioned problem.

Briefly, the claimed invention provides a charge pump circuit comprising a plurality of driving units cascaded in series. Each driving unit comprises an input port, an output port, a first node, a second node, a first capacitor electrically connected to the first node, a second capacitor electrically connected to the output port, a first transistor, a second transistor, and a third transistor. The first transistor comprises a substrate electrically connected to the second node, a gate electrically connected to the output port, a drain electrically connected to the input port, and a source electrically connected to the first node. The second transistor comprises a substrate electrically connected to the second node, a gate electrically connected to the first node, a drain electrically connected to the input port, and a source electrically connected to the output port. The third transistor comprises a substrate electrically connected to the second node, a gate electrically connected to the first node, a source electrically connected to the second node, and a drain electrically connected to the output port.

It is an advantage of the claimed invention that the claimed charge pump circuit can eliminate the body effect that may affect the actual output voltage, and the efficiency of raising positive or negative voltage levels according to the claimed charge pump circuit is improved without the degrading body effects.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
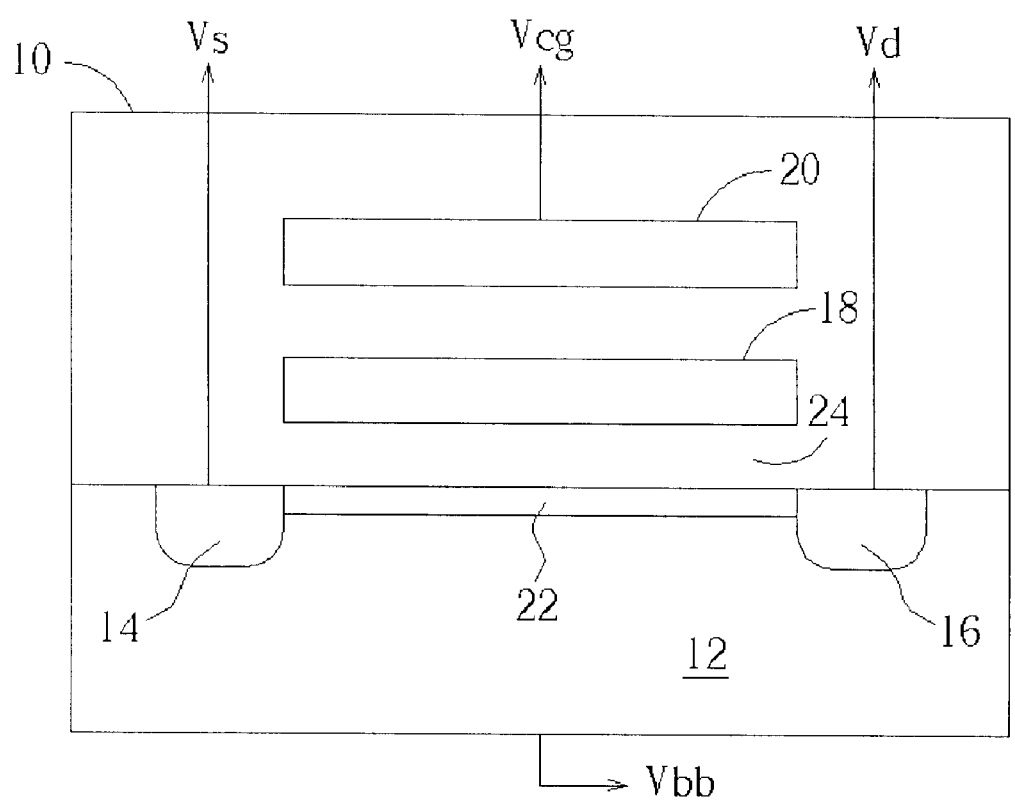
FIG. 1 is a diagram of an electrical erasable and programmable read only memory.
Figure 2:
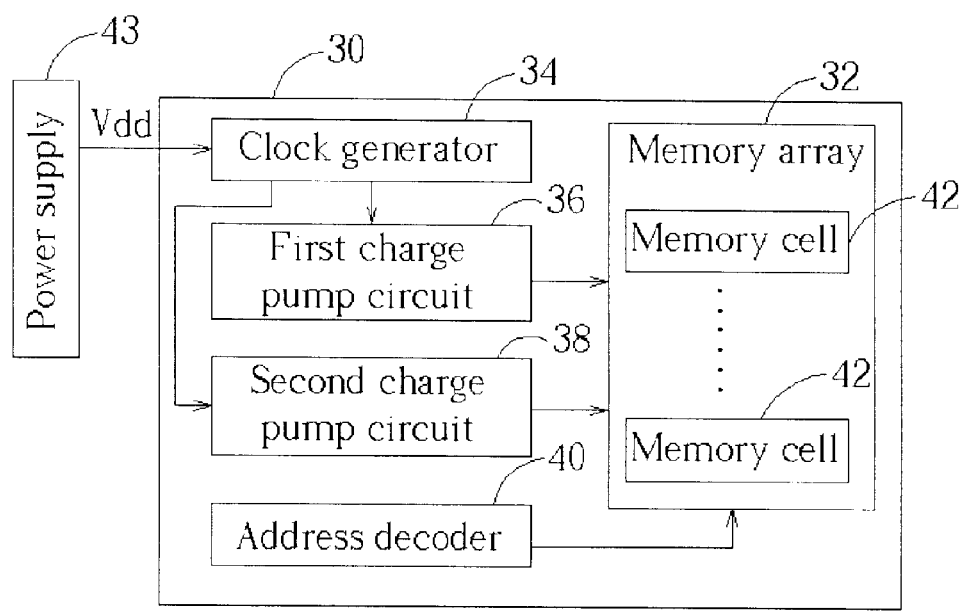
FIG. 2 is a diagram of a driving circuit of the EEPROM shown in FIG. 1.
Figure 3:
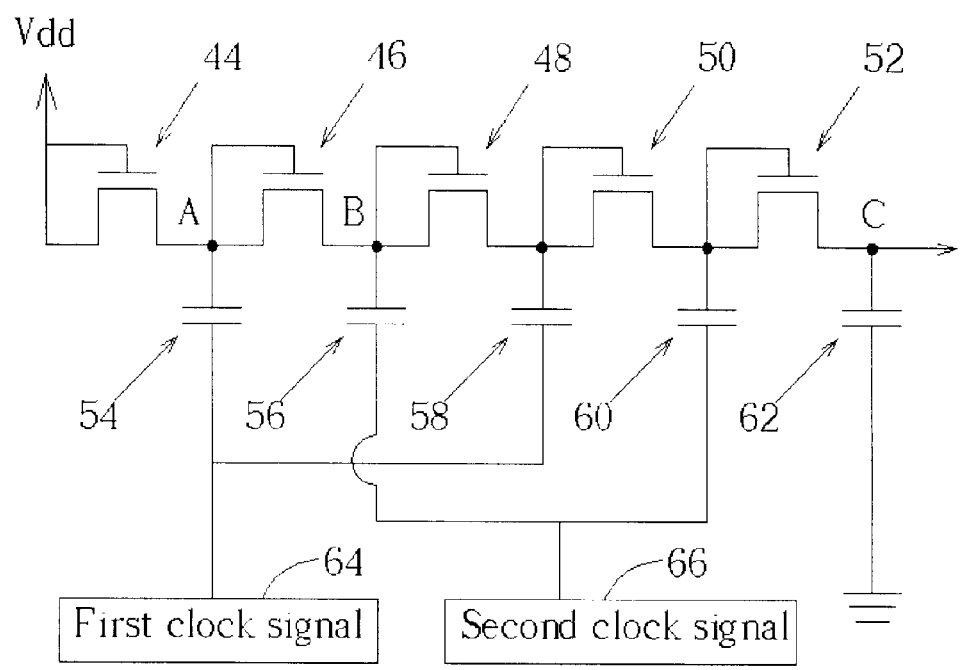
FIG. 3 is a diagram of the first charge pump circuit shown in FIG. 2.
Figure 4:
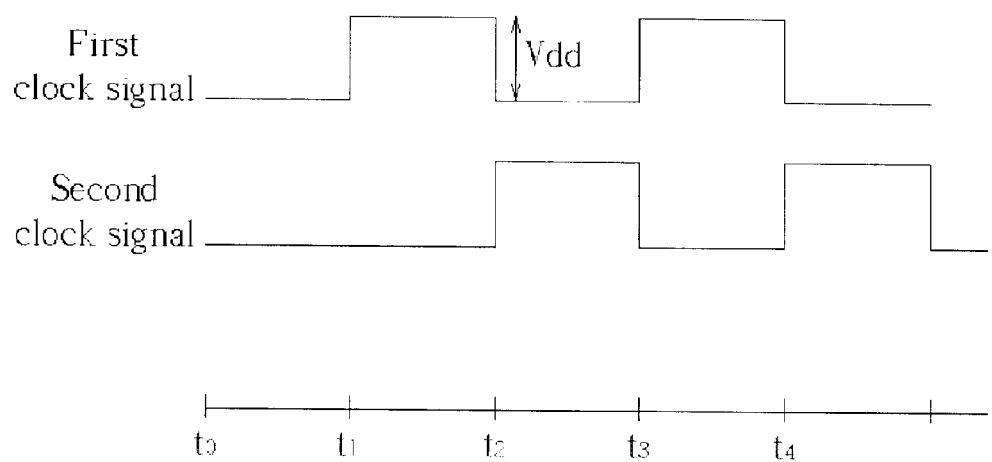
FIG. 4 is a timing diagram of the clock signals generated by the clock generator shown in FIG. 2.
Figure 5:
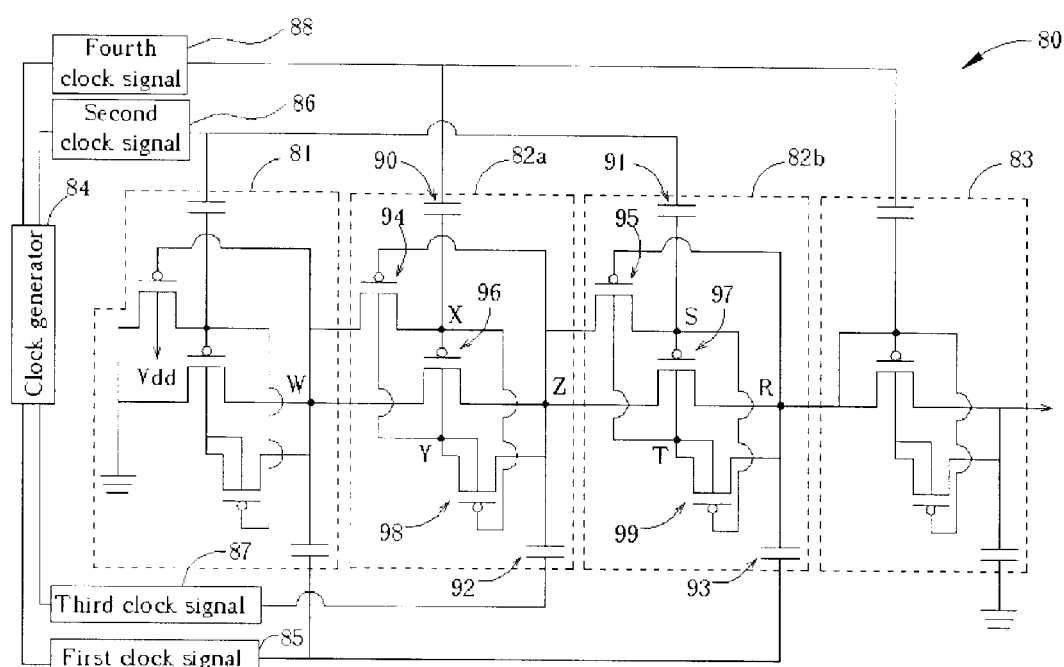
FIG. 5 is a circuit diagram of a first charge pump circuit according to the present invention.
Figure 6:
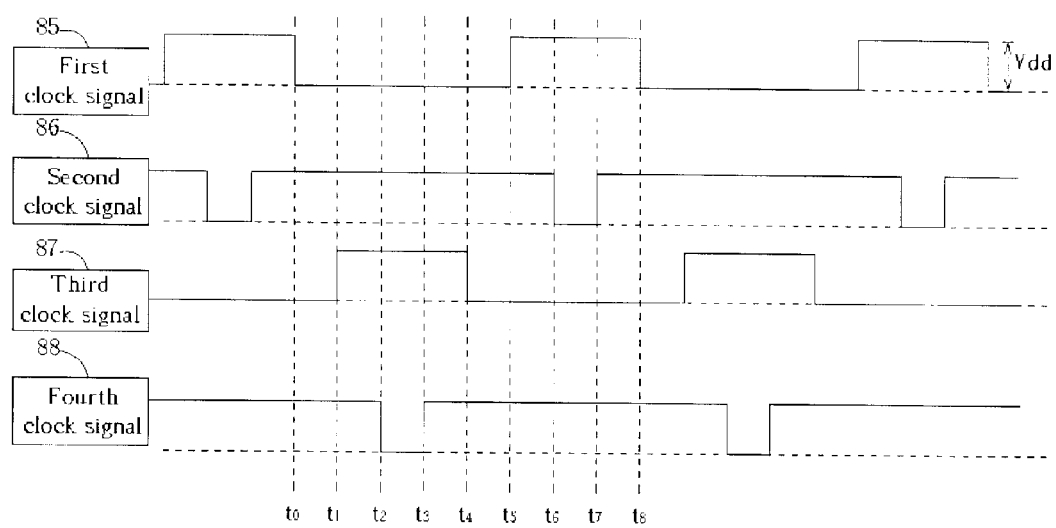
FIG. 6 is a timing diagram of the first charge pump circuit shown in FIG. 5.

Please refer to FIG. 5 and FIG. 6. FIG. 5 is a circuit diagram of a first charge pump circuit 80 according to the present invention, and FIG. 6 is a timing diagram of the first charge pump circuit 80 shown in FIG. 5. The first charge pump circuit 80 is used for generating greater negative voltages. The first charge pump circuit 80 has an input unit 81, a plurality of driving units 82a, 82b, and an output unit 83. The driving units 82a, 82b are cascaded in series, and have the same circuit design with identical circuit elements and identical connections among the circuit elements. In addition, there are only two driving units 82a, 82b shown in FIG. 5 for clarity. The driving unit 82a has a plurality of capacitors 90, 92 and a plurality of transistors 94, 96, 98. The driving unit 82b also has a plurality of capacitors 91, 93 and a plurality of transistors 95, 97, 99. In the driving unit 82a, the transistors 94, 96, 98 are p-channel metal-oxide semiconductor (PMOS) transistors. With regard to the transistor 94, a substrate is electrically connected to a node Y, a gate is electrically connected to a node Z, a drain is electrically connected to a node W, and a source is electrically connected to a node X. With regard to the transistor 96, a substrate is electrically connected to the node Y, a gate is electrically connected to the node X, a drain is electrically connected to the node W, and a source is electrically connected to the node Z. With regard to the transistor 98, a substrate is electrically connected to the node Y, a gate is electrically connected to the node X, a source is electrically connected to the node Y, and a drain is electrically connected to the node Z. Furthermore, a clock generator 84 is used for generating a first clock signal 85, a second clock signal 86, a third clock signal 87 and a fourth clock signal 88 inputted into the driving units 82a, 82b. As shown in FIG. 6, only one of the first clock signal 85, the second clock signal 86, the third clock signal 87 and the fourth clock signal 88 will change an associated voltage level each time. For example, the amplitude of each clock signal is equal to an operating voltage Vdd of the first charge pump circuit 80. At time t0, only the first clock signal 85 changes a corresponding voltage level from a high voltage level to a low voltage level. At time t1, only the third clock signal 87 changes a corresponding voltage level from the low voltage level to the high voltage level. Therefore, the clock generator 84 does not generate a plurality of clock signals that change corresponding voltage levels at the same time. Please note that the operating voltage Vdd is inputted to the substrates of the transistors before the first charge pump circuit 80 starts operating in order to prevent the transistors from generating any PN junction conduction between the p-doped regions and the n-doped regions inside the transistors because of a forward bias. In addition, the transistors 94, 95, 96, 97, 98 are all based on a triple well structure.

The operation of first charge pump circuit 80 is described as follows. Suppose that the input unit 81 outputs a voltage level V0 to the node W of the driving unit 82a, and the difference between the high voltage level and the low voltage level of the clock signals generated by the clock generator 84 is equal to the operating voltage Vdd. At time t0, the first clock signal 85 changes a corresponding voltage level from the high voltage level to the low voltage level so that the voltage level of node W deviates down by an operating voltage Vdd, that is, V0−Vdd. Now, the third clock signal 87 has the low voltage level, but the fourth clock signal 88 has the high voltage level. Therefore, the transistor 96 is turned off, but the transistor 94 is turned on. Because the transistor 94 is turned on, the voltage level of node X is lowered to make the capacitor 90 store more negative charges. The substrate of the transistor 94 is electrically connected to the node Y not a ground so that the transistor 94 is not seriously affected by the related body effect. At time t1, the third clock signal 87 changes a related voltage level from the low voltage level to the high voltage level. The transistor 94 is turned off, and the voltage level of node Z is increased by Vdd. At time t2, the fourth clock signal 88 changes a related voltage level from the high voltage level to the low voltage level. Because the capacitor 90 has stored more negative charges, the transistor 98 is turned on after the voltage of node X is decreased by Vdd. When the transistor 98 is turned on, the voltage level of node Y varies according to the voltage level of node Z. For example, when the voltage level of node Z decreases, the voltage level of node Y will decrease because the transistor 98 is turned on. Therefore, the substrate and source of the transistor 96 will have the same voltage level when the transistor 98 is turned on. In other words, the body effect associated with the transistor 96 is further reduced. During an interval between t2 and t3, not only is the transistor 96 is turned on, but also the voltage difference between the gate and the source of the transistor 96 is increased safely to transfer more charges. Therefore, positive charges move from the node Z to the node W through the transistor 96. The capacitor 92 will store more negative charges. In addition, the voltage level of node X is lower than the voltage levels of nodes W, Z by at least a voltage difference Vt during the interval between t2 and t3. So, the voltage level of node W will approach V0−Vdd without the additional voltage drop Vt (threshold voltage) caused by the transistor 96. At time t3, the fourth clock signal 88 changes a related voltage level from the low voltage level to the high voltage level so that the voltage level of node X is increased by Vdd to turn off the transistor 96.

As mentioned above, the driving units 82a, 82b are cascaded in series, that is, the driving unit 82a functions as the first stage, and the driving unit 82b functions as the second stage. The driving unit 82b is used for further taking over the output voltage at the node Z. At time t4, the third clock signal 87 changes the related voltage level from the high voltage level to the low voltage level so that the voltage level of node Z approaches V0−2Vdd. Now, the first clock signal 85 has the low voltage level, but the second clock signal 86 has the high voltage level. Therefore, the transistor 97 is turned off, and the transistor 95 is turned on. Because the transistor 95 is turned on, the voltage level of node S is lowered to make the capacitor 91 store more negative charges. The substrate of the transistor 95 is electrically connected to the node T, not the ground, so that the transistor 95 is not seriously affected by the related body effect. At time t5, the first clock signal 85 changes a related voltage level from the low voltage level to the high voltage level. The transistor 95 is turned off, and the voltage level of node R is increased by Vdd. At time t6, the second clock signal 86 changes a related voltage level from the high voltage level to the low voltage level. Because the capacitor 91 has stored more negative charges, the transistor 99 is turned on after the voltage of node S is decreased by Vdd. When the transistor 99 is turned on, the voltage level of node T varies according to the voltage level of node R. For example, when the voltage level of node R decreases, the voltage level of node T will decrease because the transistor 99 is turned on. Therefore, the substrate and source of the transistor 97 will have the same voltage level when the transistor 99 is turned on. In other words, the body effect associated with the threshold voltage of the transistor 97 is further reduced. Not only is the transistor 97 is turned on, but also the voltage difference between the gate and the source of the transistor 97 is increased safely to transfer more charges. Therefore, negative charges stored in the capacitor 92 move from the node Z to the node R through the transistor 97. The capacitor 93, therefore, will store more negative charges. As mentioned above, the voltage level of node Z will approach V0−2Vdd without the additional voltage drop Vt caused by the transistor 97. At time t7, the second clock signal 86 changes a related voltage level from the low voltage level to the high voltage level so that the voltage level of node S is increased by Vdd to turn off the transistor 97. Please note that the transistor 96 of the driving unit 82a is kept off during an interval between t4 and t7. In other words, the voltage level of node Z is not affected by the driving unit 82a when the driving unit 82b is operating. Therefore, the voltage level of node R finally becomes V0−2Vdd from t0 to t7, and is outputted to the output unit 83.

As mentioned above, if the first charge pump circuit 80 has more driving units cascaded in series, the first charge pump circuit 80 can output a lower negative voltage. In the preferred embodiment, the voltage levels of nodes Y, T vary according to the voltage levels of nodes Z, R when the transistors 98, 99 are turned on. The body effect is greatly cut down without reducing the actual output voltage of the first charge pump circuit 80. In addition, the driving units 82a, 82b are driven sequentially. When the driving unit 82b is operating, the transistor 96 of the driving unit 82a is kept off without interfering with the driving unit 82a. In other words, when one driving unit is operating, other adjacent driving units will not operate to affect the driving unit that is working. It is noteworthy that the substrate of the transistor 98 in each driving unit 82 can be electrically connected to a predetermined voltage (Vdd for example) to achieve the same objective of pumping charges without body effects. In addition, substrates of the transistor positioned at a lower location in the input unit 81 and the transistor positioned at a lower location in the output unit 83 can be electrically connected to a predetermined voltage (Vdd for example) as well.

Figure 7:
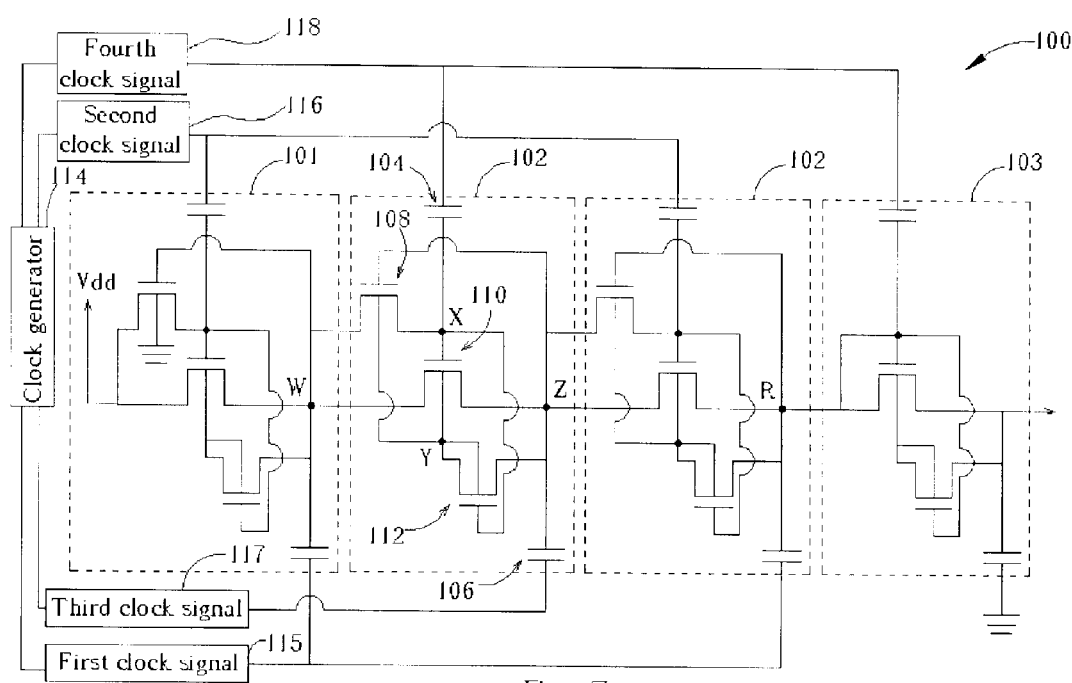
FIG. 7 is a circuit diagram of a second charge pump circuit according to the present invention.
Figure 8:
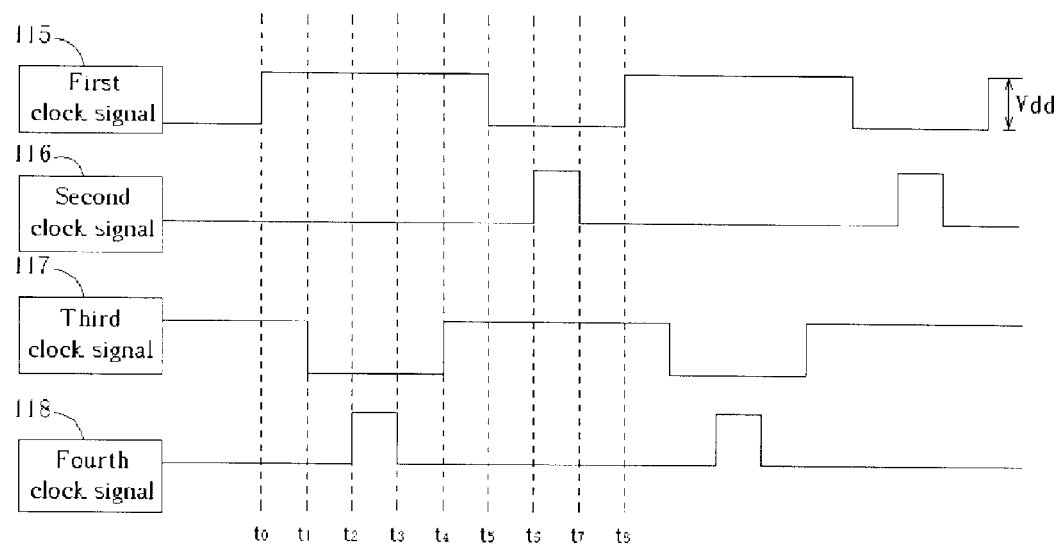
FIG. 8 is a timing diagram of the second charge pump circuit shown in FIG. 7.

Please refer to FIG. 7 and FIG. 8. FIG. 7 is a circuit diagram of a second charge pump circuit 100 according to the present invention, and FIG. 8 is a timing diagram of the second charge pump circuit 100 shown in FIG. 7. The second charge pump circuit 100 is used for generating high positive voltages. The second charge pump circuit 100 has an input unit 101, a plurality of driving units 102, and an output unit 103. The second charge pump circuit 100 is equivalent to the first charge pump circuit 80 having n-channel metal-oxide semiconductor (NMOS) transistors instead of PMOS transistors. Each of the driving units 102 has a plurality of capacitors 104, 106 and a plurality of transistors 108, 110, 112. Please note that the ground voltage (0 volts) is inputted to the substrate of each transistor before the second charge pump circuit 100 starts operating in order to prevent the transistors from generating any PN junction conduction between the p-doped region and the n-doped region inside the transistors because of a forward bias. Furthermore, a clock generator 114 is used for generating a first clock signal 115, a second clock signal 116, a third clock signal 117, and a fourth clock signal 118 inputted into the driving units 102.

The operation of second charge pump circuit 100 is described as follows. Suppose that the input unit 101 outputs a voltage level V0 to the node W of the driving unit 102, and the difference between the high voltage level and the low voltage level of the clock signals generated by the clock generator 114 is equal to the operating voltage Vdd. At time t0, the first clock signal 115 changes a corresponding voltage level from the low voltage level to the high voltage level so that the voltage level of node W deviates up by an operating voltage Vdd, that is, V0+Vdd. Now, the third clock signal 117 has the high voltage level, but the fourth clock signal 118 has the low voltage level. Therefore, the transistor 110 is turned off, but the transistor 108 is turned on. Because the transistor 108 is turned on, the voltage level of node X is raised to make the capacitor 104 store more positive charges so that the transistor 112 is turned on. When the transistor 112 is turned on, the voltage level of node Y varies according to the voltage level of node Z. The substrate and source of the transistor 110, therefore, will have the same voltage level when the transistor 112 is turned on. In other words, the body effect associated with the transistor 110 is further reduced. At time t1, the third clock signal 117 changes a related voltage level from the high voltage level to the low voltage level. The transistor 108 is turned off, and the voltage level of node Z is decreased by Vdd. At time t2, the fourth clock signal 118 changes a related voltage level from the low voltage level to the high voltage level. Because the capacitor 104 has stored more positive charges, the transistor 110 is turned on after the voltage level of node X is raised by Vdd. In addition, the voltage difference between the gate and the source of the transistor 110 is increased safely to transfer more charges. Therefore, the positive charges moving from the node W to the node Z through the transistor 110 make the capacitor 106 store more positive charges. Furthermore, the transistor 112 is turned on for cutting down the related body effect of the transistor 110. The voltage level of node Z will easily approach V0+2Vdd. At time t3, the fourth clock signal 118 changes a related voltage level from the high voltage level to the low voltage level so that the transistor 110 is turned off after the voltage level of node X is decreased by Vdd. Then, the driving unit 102 of the next stage will carry on the task of the previous stage to handle the output at the node Z. At time t4, the third clock signal 117 changes the related voltage level from the low voltage level to the high voltage level so that the voltage level of node Z is increased by Vdd to be V0+2Vdd. Finally, the second charge pump circuit 100 will make the voltage level of node R approach V0+2Vdd as the first charge pump circuit 80 does during an interval between t0 to t7. The voltage level of node R is transferred to the output unit 103.

As mentioned above, if the second charge pump circuit 100 has more driving units 102 cascaded in series, the second charge pump circuit 100 can output a higher positive voltage. In the preferred embodiment, the voltage level of node Y varies according to the voltage level of node Z when the transistor 112 is turned on. The body effect is greatly cut down without reducing the actual output voltage of the second charge pump circuit 100. The efficiency of raising voltage levels is greatly improved. In addition, when one driving unit is operating, other adjacent driving units will not operate to interfere with the driving unit that is working. It is noteworthy that the substrate of the transistor 112 in each driving unit 102 can be electrically connected to a predetermined voltage (0 volts for example) to achieve the same objective of pumping charges without body effects. In addition, substrates of the transistor positioned at a lower location in the input unit 101 and the transistor positioned at a lower location in the output unit 103 can be electrically connected to a predetermined voltage (0 volts for example) as well.

Figure 9:
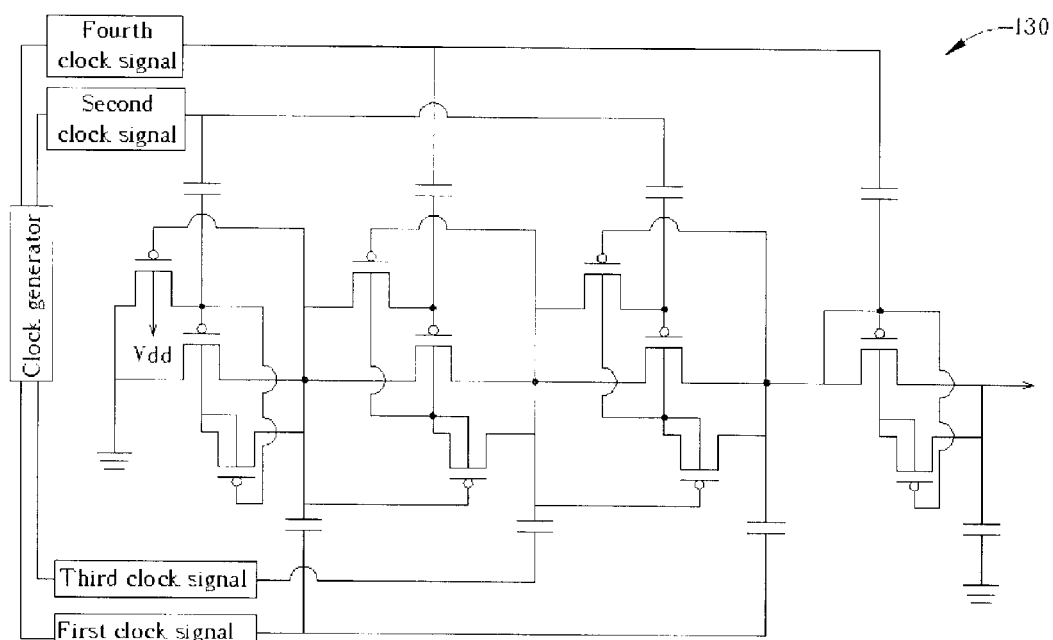
FIG. 9 is a circuit diagram of a third charge pump circuit according to the present invention.

Please refer to FIG. 5, FIG. 6, and FIG. 9. FIG. 9 is a circuit diagram of a third charge pump circuit 130 according to the present invention. The third charge pump circuit 130 is similar to the first charge pump circuit 80 except for a different connection of the transistor 98 in the first charge pump circuit 80. The third charge pump circuit 130 is used for generating greater negative voltages as the first charge pump circuit 80. As shown in FIG. 5, the gate of the transistor 98 in the first charge pump circuit 80 is electrically connected to the node X. If the gate of the transistor 98 in the first charge pump circuit 80 is electrically connected to the node W, the third charge pump circuit 130 (shown in FIG. 9) is established. The operation of the third charge pump circuit 130 is identical to operation of the first charge pump circuit 80. Both the first charge pump circuit 80 and the third charge pump circuit 130 are driven according to the same timing diagram shown in FIG. 6. Similarly, the third charge pump circuit 130 also can diminish the related body effect so that the actual output voltage is not greatly deviated from the ideal value.

Figure 10:
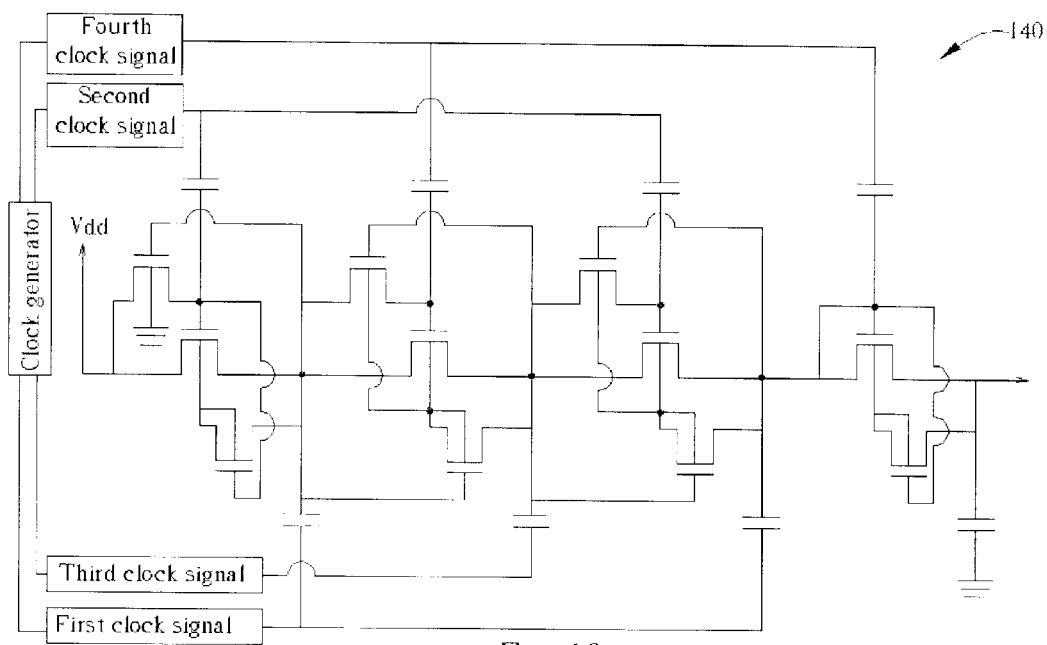
FIG. 10 is a circuit diagram of a fourth charge pump circuit according to the present invention.

Please refer to FIG. 7, FIG. 8, and FIG. 10. FIG. 10 is a circuit diagram of a fourth charge pump circuit 140 according to the present invention. The fourth charge pump circuit 140 is similar to the second charge pump circuit 100 except for a different connection of the transistor 102 in the second charge pump circuit 100. The fourth charge pump circuit 140 is used for generating greater positive voltages as the second charge pump circuit 100. As shown in FIG. 7, the gate of the transistor 102 in the second charge pump circuit 100 is electrically connected to the node X. If the gate of the transistor 102 in the second charge pump circuit 100 is electrically connected to the node W, the fourth charge pump circuit 140 (shown in FIG. 10) is established. The operation of the fourth charge pump circuit 140 is identical to operation of the second charge pump circuit 100. Both the second charge pump circuit 100 and the fourth charge pump circuit 140 are driven according to the same timing diagram shown in FIG. 8. Similarly, the fourth charge pump circuit 140 also can diminish the related body effect so that the actual output voltage is not greatly deviated from the ideal value.

Figure 11:
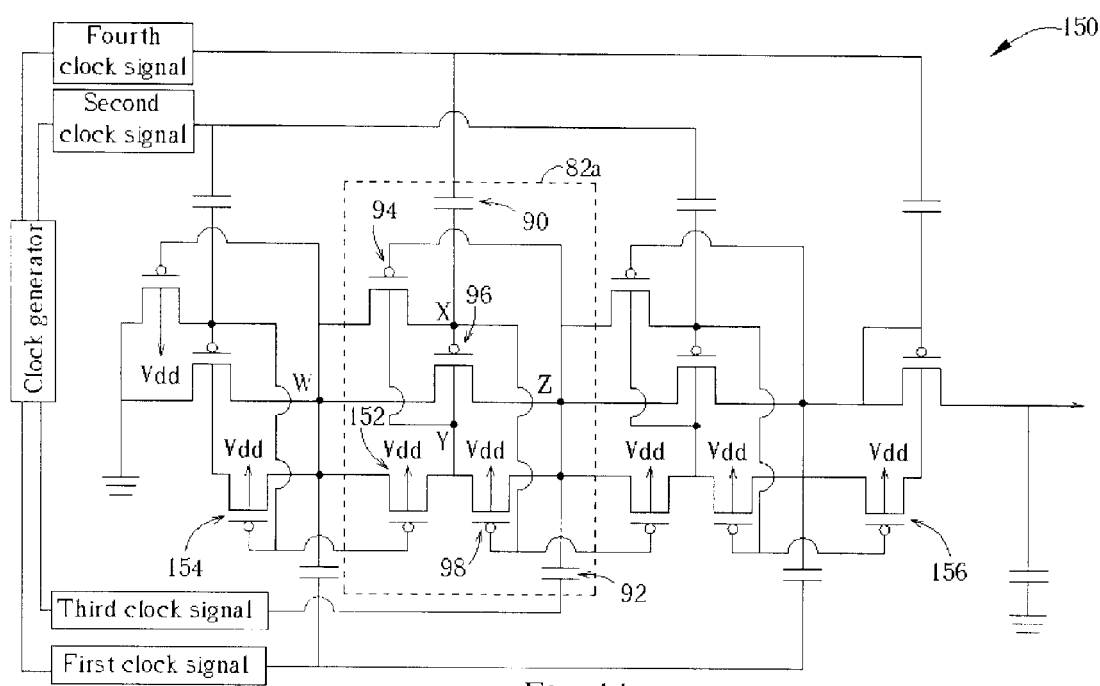
FIG. 11 is a circuit diagram of a fifth charge pump circuit according to the present invention.
Figure 12:
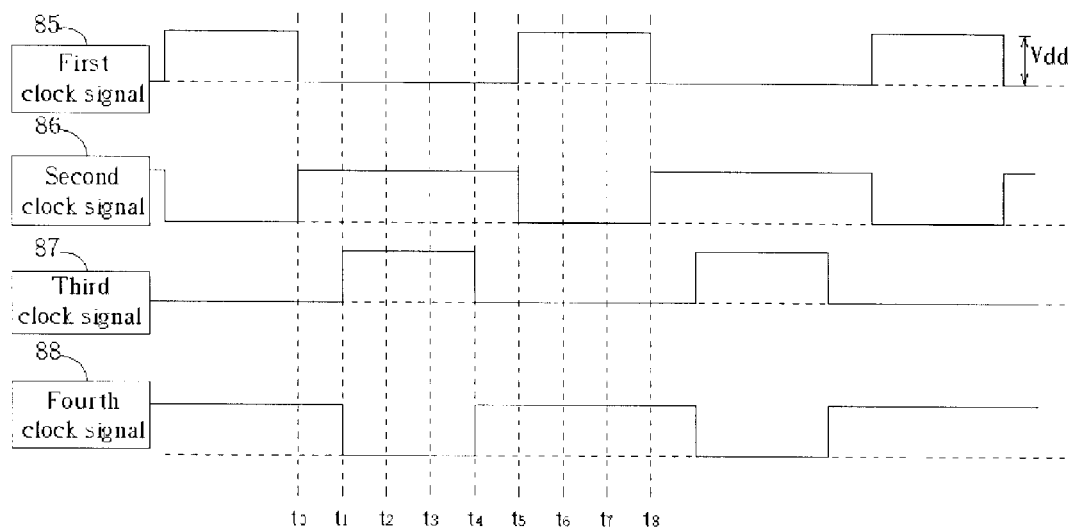
FIG. 12 is a timing diagram of the fifth charge pump circuit shown in FIG. 11.

Please refer to FIG. 5, FIG. 6, FIG. 11, and FIG. 12. FIG. 11 is a circuit diagram of a fifth charge pump circuit 150 according to the present invention, and FIG. 12 is a timing diagram of the fifth charge pump circuit 150 shown in FIG. 11. The fifth charge pump circuit 150 is similar to the first charge pump circuit 80 except for a different connection between the transistors in each unit 81, 82, 83 shown in the first charge pump circuit 80. The fifth charge pump circuit 150 is used for generating greater negative voltages as the first charge pump circuit 80. Compared with the first charge pump circuit 80 shown in FIG. 5, the fifth charge pump circuit 150 adds a transistor 152 for each driving unit 82. The transistor 152 is a PMOS transistor in this preferred embodiment. Concerning the input unit 81 and the driving unit 82a, the gate of the transistor 152 is electrically connected to the gate of the transistor 154, and the drain and source of the transistor 152 are electrically connected to nodes W and Y respectively. In addition, the substrate of the transistor 152 is electrically connected to an operating voltage Vdd. The connection with regard to the transistor 152 in each driving unit 82 is similar, and is illustrated in FIG. 11. Furthermore, the substrate of the transistor 154 in the input unit 81 and the substrate of the transistor 156 in the output unit 83 are electrically connected to the operating voltage Vdd. For the driving units 82, the substrate of the transistor 98 is electrically connected to the operating voltage Vdd as well. With the connection adjustment as mentioned above, the fifth charge pump circuit 150 (shown in FIG. 11) is established. The introduction of the transistor 152 in each driving unit 82 is used for avoiding PN junction conduction of the first charge pump circuit 80 at an initial operation of each cascaded stage. For example, when the transistor 154 in the input unit is turned on, the transistor 152 in the next unit cascaded to the input unit is turned on as well. Therefore, the voltages at drain and source of the transistor 152 will approach the same level during the first few clock cycles. Similarly, the voltages at drain and source of the transistor 98 will approach the same level as well because of the corresponding clock signal. In other words, transistor 96 whose substrate is always electrically connected to either the voltage level of node W or the voltage level of node Z is capable of avoiding the PN junction conduction between source/drain and substrate at any time. The transistor 152 will not alter operation of the driving unit. Generally speaking, the operation of the fifth charge pump circuit 150 is identical to operation of the first charge pump circuit 80. Both the first charge pump circuit 80 and the fifth charge pump circuit 150 are driven according to the same timing diagram shown in FIG. 6. In addition, the timing diagram shown in FIG. 12 is also capable of driving the fifth charge pump circuit 150 appropriately. That is, both timing diagrams shown in FIG. 6 and FIG. 12 can be used for driving the fifth charge pump circuit 150. As mentioned before, the fifth charge pump circuit 150 like the first charge pump circuit 80 also can diminish the related body effect so that the actual output voltage is not greatly deviated from the ideal value.

Figure 13:
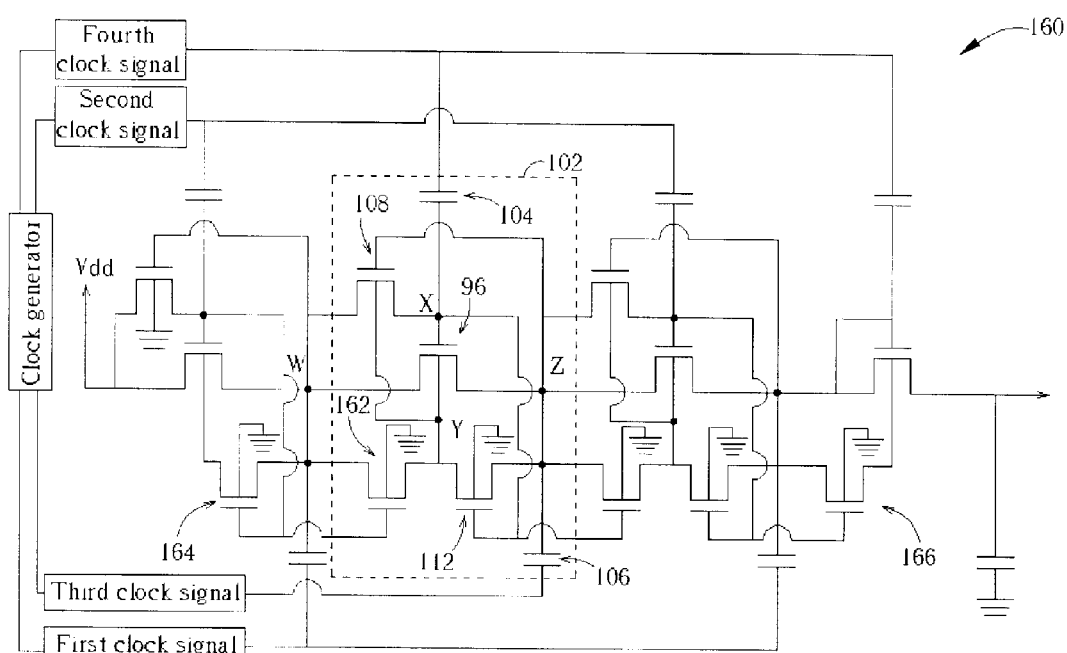
FIG. 13 is a circuit diagram of a sixth charge pump circuit according to the present invention.
Figure 14:
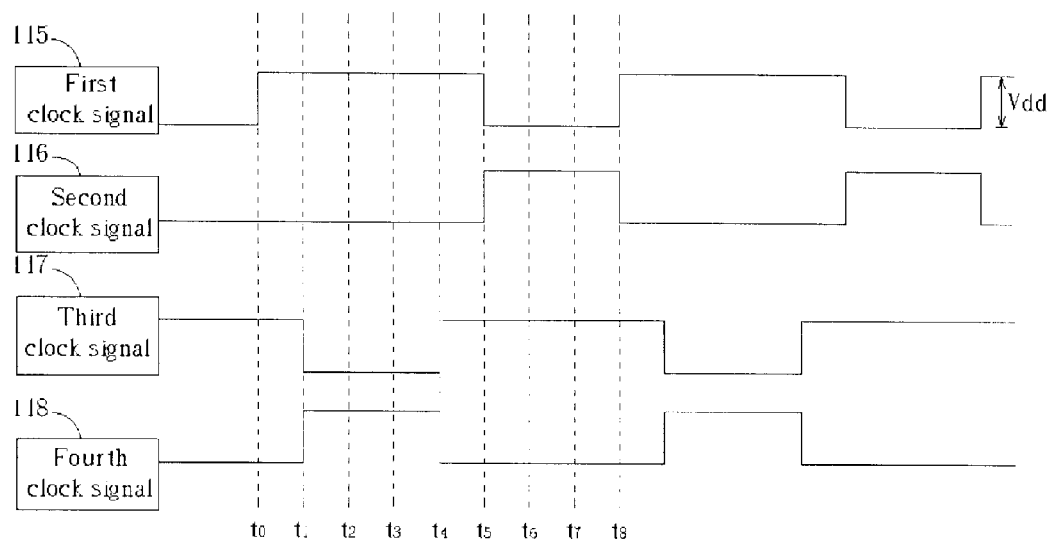
FIG. 14 is a timing diagram of the sixth charge pump circuit shown in FIG. 13.

Please refer to FIG. 7, FIG. 8, FIG. 13, and FIG. 14. FIG. 13 is a circuit diagram of a sixth charge pump circuit 160 according to the present invention, and FIG. 14 is a timing diagram of the sixth charge pump circuit 160 shown in FIG. 13. The sixth charge pump circuit 160 is similar to the second charge pump circuit 100 except for a different connection between the transistors in each unit 101, 102, 103 shown in the second charge pump circuit 100. The sixth charge pump circuit 160 is used for generating greater positive voltages as the second charge pump circuit 100. Compared with the second charge pump circuit 100 shown in FIG. 7, the sixth charge pump circuit 160 adds a transistor 162 for each driving unit 102. The transistor 162 is a NMOS transistor in this preferred embodiment. The gate of the transistor 162 is electrically connected to the gate of the transistor 164, and the source and drain of the transistor 162 are electrically connected to nodes Y and W respectively. In addition, the substrate of the transistor 162 is electrically connected to a ground voltage. The connection of the transistor 162 in each driving unit 82 is similar, and is illustrated in FIG. 13. Further more, the substrate of the transistor 164 in the input unit 101 and the substrate of the transistor 166 in the output unit 103 are electrically connected to the ground voltage. For the driving units 102, the substrate of the transistor 112 is electrically connected to the ground voltage as well. With the connection adjustment, the sixth charge pump circuit 160 (shown in FIG. 13) is established. The introduction of the transistor 162 in each driving unit 102 is used for avoiding PN junction conduction of the second charge pump circuit 100 at an initial operation of each cascaded stage. For example, when the transistor 164 in the input unit is turned on, the transistor 162 in the next unit cascaded to the input unit is turned on as well. Therefore, the voltages at drain and source of the transistor 162 will approach the same level during the first few clock cycles. Similarly, the voltages at drain and source of the transistor 112 will approach the same level as well because of the corresponding clock signal. In other words, transistor 96 whose substrate is always electrically connected to either the voltage level of node W or the voltage level of node Z is capable of avoiding the PN junction conduction between source/drain and substrate at any time. The transistor 162 will not alter operation of the driving unit. Generally speaking, the operation of the sixth charge pump circuit 160 is identical to operation of the second charge pump circuit 100. Both the second charge pump circuit 100 and the sixth charge pump circuit 160 are driven according to the same timing diagram shown in FIG. 8. In addition, the timing diagram shown in FIG. 14 is also capable of driving the sixth charge pump circuit 160 appropriately. That is, both timing diagrams shown in FIG. 8 and FIG. 14 can be used for driving the sixth charge pump circuit 160. As mentioned before, the sixth charge pump circuit 160 like the second charge pump circuit 100 also can diminish the related body effect so that the actual output voltage is not greatly deviated from the ideal value.

In contrast to the prior art charge pump circuit, the charge pump circuit according to the present invention discloses that substrates of the transistors within one driving unit are all electrically connected together, and the voltage levels of substrates associated with the transistors within the driving unit will vary according to the output voltage outputted by the driving unit. For the claimed charge pump circuit that outputs greater positive voltages, the voltage levels of the substrates in the driving unit are raised according to the increase of the output voltage. Therefore, the voltage difference between the substrate and the source of each transistor in the driving unit is reduced for diminishing the related body effect. The output voltage outputted by the claimed charge pump circuit will not be greatly reduced owing to the slight body effect. However, the prior art charge pump circuit that outputs greater positive voltages has transistors in the driving unit with corresponding substrates electrically connected to the ground voltage. When the output voltage is raised gradually because of the cascaded driving units, the voltage difference between the substrate and the source of each transistor in the driving units induces a corresponding body effect to diminish the output voltage. The greater the output voltage is, the more serious the body effect is. In other words, the efficiency of raising the voltage level is reduced. For the claimed charge pump circuit that outputs greater negative voltages, the voltage levels of the substrates in the driving unit are lowered according to the decrease of the output voltage. Therefore, the voltage difference between the substrate and the source of each transistor in the driving unit is reduced for diminishing the related body effect. To sum up, the charge pump circuit according to the present invention can eliminate the body effect that may affect the actual output voltage, and the efficiency of raising voltage levels according to the present invention is improved without the related body effects.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A charge pump circuit comprising a plurality of driving units cascaded in series, each driving unit comprising:
    an input port;
    an output port;
    a first node;
    a second node;
    a first capacitor electrically connected to the first node;
    a second capacitor electrically connected to the output port;
    a first transistor comprising:
    a substrate electrically connected to the second node;
    a gate electrically connected to the output port;
    a drain electrically connected to the input port; and
    a source electrically connected to the first node;
    a second transistor comprising:
    a substrate electrically connected to the second node;
    a gate electrically connected to the first node;
    a drain electrically connected to the input port; and
    a source electrically connected to the output port;
    a third transistor comprising:
    a substrate electrically connected to a first predetermined voltage;
    a gate;
    a source electrically connected to the second node; and
    a drain electrically connected to the output port; and
    a fourth transistor comprising:
    a substrate electrically connected to a second predetermined voltage;
    a gate;
    a source electrically connected to the second node; and
    a drain electrically connected to the input port;
    wherein the gate of the fourth transistor within one driving unit is electrically connected to the gate of the third transistor within previous adjacent driving unit.

2. The charge pump circuit of claim 1 wherein the first, second, third, and fourth transistors are p-channel metal-oxide semiconductor (PMOS) transistors.

3. The charge pump circuit of claim 1 wherein the first, second, third, and fourth transistors are n-channel metal-oxide semiconductor (NMOS) transistors.

4. The charge pump circuit of claim 1 wherein each of the first, second, third, fourth transistors comprises a triple well structure.

5. The charge pump circuit of claim 1 further comprising an input unit connected to a beginning of the driving units cascaded in series, the input unit comprising:
    an input port;
    an output port electrically connected to the input port of the driving unit which is positioned in the beginning of the driving units cascaded in series;
    a first node;
    a second node;
    a first capacitor electrically connected to the first node;
    a second capacitor electrically connected to the output port;
    a first transistor comprising:
    a substrate electrically connected to a third predetermined voltage;
    a gate electrically connected to the output port;
    a drain electrically connected to the input port; and
    a source electrically connected to the first node;
    a second transistor comprising:
    a substrate electrically connected to the second node;
    a gate electrically connected to the first node;
    a drain electrically connected to the input port; and
    a source electrically connected to the output port; and
    a third transistor comprising:
    a substrate electrically connected to a fourth predetermined voltage;
    a gate electrically connected to the first node and the gate of the fourth transistor of the driving unit positioned in the beginning of the driving units cascaded in series;
    a source electrically connected to the second node; and
    a drain electrically connected to the output port.

6. The charge pump circuit of claim 1 further comprising an output unit connected to a last of the driving units cascaded in series, the output unit comprising:
    an input port electrically connected to the output port of the last of the driving units cascaded in series;
    an output port;
    a first node;
    a first capacitor electrically connected to the input port;
    a second capacitor electrically connected to the output port;
    a first transistor comprising:
    a substrate electrically connected to the first node;
    a gate electrically connected to the input port;
    a drain electrically connected to the input port; and
    a source electrically connected to the output port; and
    a second transistor comprising:
    a substrate electrically connected to a fifth predetermined voltage;
    a gate electrically connected to the gate of the third transistor of the last of the driving units cascaded in series;
    a source electrically connected to the substrate of the first transistor; and
    a drain electrically connected to the input port.

* * * * *